(12) United States Patent
Six (10) Patent No.: US 6,762,524 B2
(45) Date of Patent: Jul. 13, 2004

(54) MAGNETIC DRIVE SYSTEM FOR A VEHICLE DIFFERENTIAL

(76) Inventor: Albert Six, 230 S.Tobin, Renton, WA (US) 98055

( * ) Notice: Subject to any disclaimer, the term of this patent is extended or adjusted under 35 U.S.C. 154(b) by 0 days.

(21) Appl. No.: 10/340,043

(22) Filed: Jan. 10, 2003

(65) Prior Publication Data

US 2004/0021384 A1 Feb. 5, 2004

Related U.S. Application Data

(63) Continuation-in-part of application No. 10/211,724, filed on Aug. 1, 2002.

(51) Int. Cl.$^7$ ................................................ H02P 15/00
(52) U.S. Cl. ...................................... 310/103; 310/80
(58) Field of Search ...................... 310/80, 103, 104, 310/105, 209, 191, 12, 13; 464/29; 74/650; 180/65.1

(56) References Cited

U.S. PATENT DOCUMENTS 5,834,872 A * 11/1998 Lamb ......................... 310/103
6,005,317 A * 12/1999 Lamb ......................... 310/103

\* cited by examiner

*Primary Examiner*—Burton S. Mullins
*Assistant Examiner*—Leda Pham
(74) *Attorney, Agent, or Firm*—Jensen & Puntigam, P.S.

(57) ABSTRACT

The magnetic drive system includes a motor and associated motor shaft and a motor assembly, the motor assembly including an electronically conductive cylinder. A machine assembly for driving a machine includes a permanent magnet assembly. The motor assembly and the machine assembly are arranged and supported relative to each other so that the permanent magnet assembly and the electrically conductive cylinder are in longitudinal juxtaposition so that rotation of the motor shaft results in rotation of the machine shaft through magnetic action.

6 Claims, 8 Drawing Sheets

MAGNETIC DRIVE SYSTEM FOR A VEHICLE DIFFERENTIAL

PRIOR APPLICATION

This application is a continuation-in-part application of U.S. Ser. No. 10/211,724, filed Aug. 1, 2002.

TECHNICAL FIELD

This invention relates generally to magnetic drive systems, and more specifically concerns a power (torque) conversion system using magnetic action between a drive member such as a motor and a driven member such as a machine, including a drive shaft for the wheels of a vehicle.

BACKGROUND OF THE INVENTION

Various arrangements are known which couple a drive assembly such as a motor and specifically the motor shaft to a machine shaft which is used to drive various mechanisms, including mechanical devices, such as a pump or the wheels of a vehicle, referred to as a driven assembly.

Most of these coupling arrangements are completely mechanical, using various gear and clutch arrangements. Various control arrangements are used to assist in the efficient coupling of the drive assembly to the driven assembly, including both mechanical and electronic devices.

A primary disadvantage of mechanical coupling arrangements is that the mechanical parts tend to wear and eventually break; the mechanical arrangement can also be complex, in both the number and the type of parts required. Also, conventional systems are usually inefficient, because the motor does not run consistently at its most efficient speed; the driven assembly/machine must operate under varied conditions of torque as well as speed. The motor is controlled, with various gear ratios, to satisfy the varying requirements of the driven assembly.

One attempt to overcome the disadvantages of a purely mechanical coupling is a magnetic coupling arrangement between the motor (the drive member) and the driven member. An example of such a magnetic coupling using two discs in registry is shown in U.S. Pat. No. 5,668,424 to Lamb et al, as well as several other patents to Lamb. However, such magnetic coupling arrangements have their own disadvantages, in that rather complicated control mechanisms must be used to control the physical distance between the magnetic coupling elements. Further, the power capacity of such existing systems is increased only by increasing the diameter of the two discs, which has practical limitations in most systems.

A magnetic coupling system, which would overcome the above disadvantages of existing magnetic, coupling devices, would be advantageous in many applications.

SUMMARY OF THE INVENTION

Accordingly, the present invention in one aspect is a magnetic drive differential system for a vehicle, comprising: a driving assembly, which is driven by a vehicle motor, which is in turn connected to a motor shaft, wherein the driving assembly includes two electrically conductive cylinders, each having a selective length; and a coupling structure which includes first and second ring-shaped assemblies of permanent magnets operating independently of each other, in association, respectively, with the two electrically conductive cylinders, the coupling structure further including first and second axle shafts to which the permanent magnet assemblies, respectively, are mounted, such that rotation of the motor shaft results in the independent rotation of the axle shafts, wherein vehicle wheels are mounted at the free ends of each axle shaft, the vehicle wheels thus operating independently of each other in response to motor action.

The present invention in another aspect is a magnetic drive differential for a vehicle, which comprises: a driving assembly, driven by a vehicle motor, wherein the driving assembly includes first and second pairs of concentric permanent magnet ring-shaped assemblies with a defined space between them; and a machine assembly, including first and second axle members which have wheels mounted thereon, each axle member including a mounting element having an electrically conductive cylinder extending therefrom, each electrically conductive cylinder configured, respectively, to fit between and come into a magnetic relationship with one pair of permanent magnet assemblies, wherein actuation of the driving assembly by the vehicle motor results in driving of the vehicle wheels.

BEST MODE FOR CARRYING OUT THE INVENTION

The present invention is a magnetic torque coupler (transfer) system positioned between a motor/motor assembly, including a motor drive shaft, and a machine or vehicle, which includes a machine shaft for driving the machine/vehicle. It is also referred to as a power transmission system. The motor assembly will in one embodiment typically include an electrically conductive element such as a copper cylinder, while the machine assembly will typically include at least one ring of permanent magnets. The conductive element and the ring of permanent magnets are positioned adjacent each other axially (longitudinally), wherein in operation magnetic interaction from the turning of the motor drive shaft results in a transfer of rotating action of the motor shaft to rotation of the machine shaft, driving the machine or vehicle. In another embodiment, the arrangement is reversed, i.e. the motor assembly includes the ring of magnets and the machine usually includes the conductive cylinder Referring now to FIGS. 1, 2A and 2B, which show a first embodiment of the invention, and which illustrate its operation, the coupling system is shown generally at 10 with a motor shaft 12 at an incoming side thereof. Secured to the motor shaft 12 is a motor shaft assembly 14 which includes a mounting disc 16 and a cylindrical member 18 which is secured to and extends away from disc 16 at the periphery of its forward directed surface 20. The disc 16 and the cylindrical member 18 are mounted on the motor shaft so as to be slidable therealong a short distance by control member 22.

Figure 1:
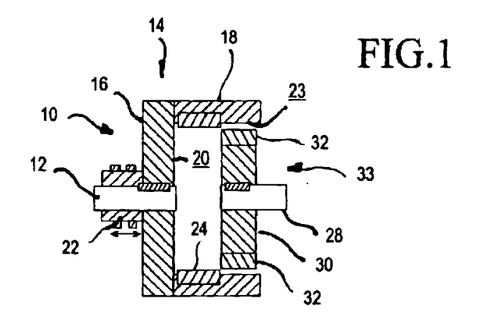
FIG. 1 is a cross-sectional view of one embodiment of the torque conversion system of the present invention.

The dimensions of the mounting disc and the cylindrical member 18 can vary. In the embodiment shown, disc 16 is approximately eight inches in diameter and one inch thick and is typically made from metal. The cylindrical member 18 is approximately eight inches in exterior diameter and two inches long, for an arrangement operating at 50 HP at 3000 RPM.

Mounted on the interior surface 23 of cylindrical member 18 is a copper electrically conductive cylinder or ring 24. In the embodiment shown, conductive cylinder 24 is approximately 0.2 inches thick, approximately ½-inch wide and approximately six inches in diameter, and extends completely around the inner surface of member 18.

On the outgoing side of the torque transfer (power transmission) system 10 is a machine shaft 28, which is connected to a machine of some kind, such as a pump, for instance, or a drive shaft for vehicle wheels. Many other machine devices can be used with the present system. Mounted on machine shaft 28 is a mounting disc 30. Mounted on the outer edge of disc 30 are a plurality of permanent magnets 32—32, which are positioned so that their north and south poles are at the opposing surfaces of disc 30. The permanent magnets are arranged so that their north and south surfaces alternate. This arrangement of magnets is shown more clearly in FIG. 2B. In the embodiment shown, there are 16 magnets of neodymium-iron-boron, one-inch by one-inch by 1/2-inch. The magnets are regularly spaced, separated by a small gap around the outer edge of disc 30. The disc 30 and magnets 32 form a machine shaft assembly 33. The number of permanent magnets 32 can vary, but at least two magnets are necessary. The magnets must be spaced such that a magnetic field is established in the copper ring (cylinder) 24.

In operation, the spaced magnets 32—32 create a magnetic field. The rotation of motor shaft assembly 14, caused by operation of the motor, results in the conductive cylinder 24 passing through the magnetic field created by the permanent magnets 32—32, which results in eddy currents being generated in the conductive cylinder. The eddy currents will produce a secondary magnetic field, which results in the machine shaft assembly 33 and hence the machine shaft 28 turning. There is thus produced a coupling of two mechanical devices (the motor and the machine/vehicle wheels) by magnetic action, without any direct mechanical contact between the two assemblies. Effective coupling occurs when the magnets 32 are juxtaposed to the copper conductive cylinder 24. The air gap between the magnets and the conductive ring in the embodiment shown is within the range of 0.04 inches to 0.12 inches (1–3 mm).

Figure 2A:
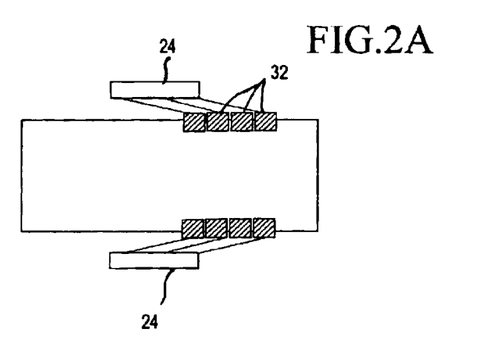
FIGS. 2A and 2B show selected portions of the embodiment of FIG. 1 for illustration of the operation of the embodiment.

The amount of torque or power transferred to the machine can be changed by moving the control element 22 in the embodiment shown along the motor shaft, which moves the motor assembly longitudinally relative to the machine assembly, changing the amount of longitudinal overlap between the two. FIG. 2A illustrates this longitudinal movement. The minimum power transferred will occur when the magnets 32 and the conductive cylinder slightly overlap. An intermediate position is when the magnets 32 and the copper conductive cylinder 24 overlap longitudinally approximately 50%, while the maximum power transfer occurs when the magnets and the copper cylinder are coincident (in registry) longitudinally. To increase the power transfer capability, the length of the conductive cylinder 24 and the length of the magnets can be increased, or the diameter of the conductive cylinder and the ring of magnets can be jointly increased, maintaining the air gap. Both of these arrangements change the total surface area between the two elements.

Figure 2B:
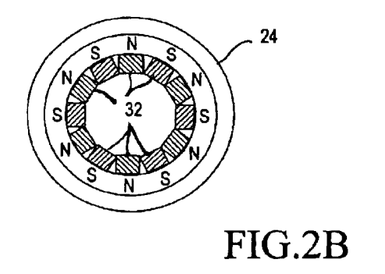

Again, the basic embodiment shown in FIGS. 1–2 uses the phenomenon of magnetic coupling between a magnetically conductive cylinder 24 and a ring of spaced permanent magnets 32, spaced internally of the conductive cylinder by a proper air gap, to couple a motor shaft to a machine shaft. The estimated power transferred between the two is 25 HP at 3000 RPM.

One of the advantages to the system of FIGS. 1–2 is that the varying demands of the particular machine (pump, vehicle, etc.) connected to the machine shaft are accommodated through changing the physical relationship between the conductive cylinder and the ring of permanent magnets by action of the control element. As discussed above, the motor and the motor shaft are run at a substantially constant speed, in particular, the speed at which the motor is at its highest efficiency. The speed of the machine shaft is varied, as necessary, by changing the relative position of the ring of permanent magnets and the conductive cylinder. Hence, the present invention is capable of providing a variable transfer of power between a motor and a machine. There is no direct mechanical contact between the two assemblies, including the motor shaft and the machine shaft. There is hence relative little wear during operation of the system, contributing to its long lifetime.

Figure 3A:
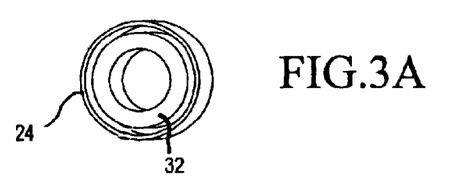
FIGS. 3A, 3B, 3c and 3d show in simplified form three different arrangements of selected parts of the torque conversion system.
Figure 3B:
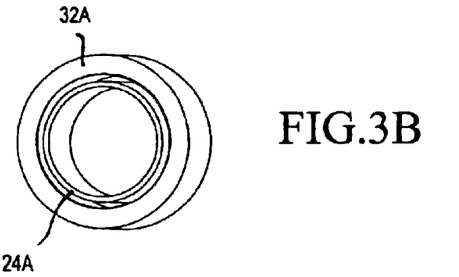

FIGS. 1, 2A and 2B show an electrically conductive cylinder 24 and a ring of spaced permanent magnets 32 located inside of mounting cylinder 18. This arrangement is shown in simplified form in FIG. 3A, for the relationship of the magnets and the conductive cylinder. However, it should be understood that that arrangement of magnets and conductive cylinder could be reversed, so that the ring of magnets 32a is positioned outside of the conductive cylinder 24a, as shown in FIG. 3B. In such a case, a supporting assembly for the magnets mounted on the machine shaft 28 would be outboard of the conductive cylinder with the magnets mounted on the interior surface of the supporting assembly and the conductive cylinder 24b located on the exterior surface of the mounting cylinder 28.

Figure 3C:
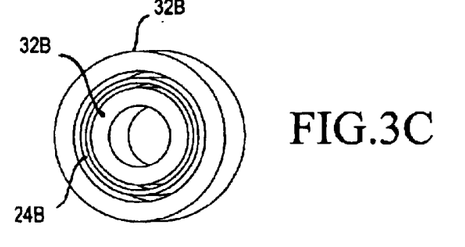
Figure 3D:
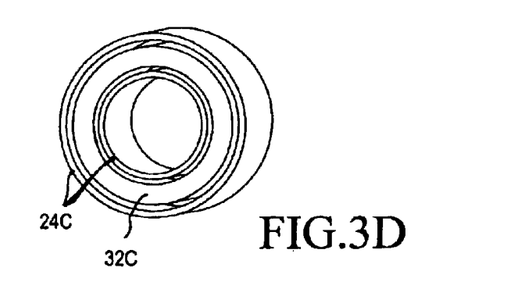
Figures 8A, 8B:
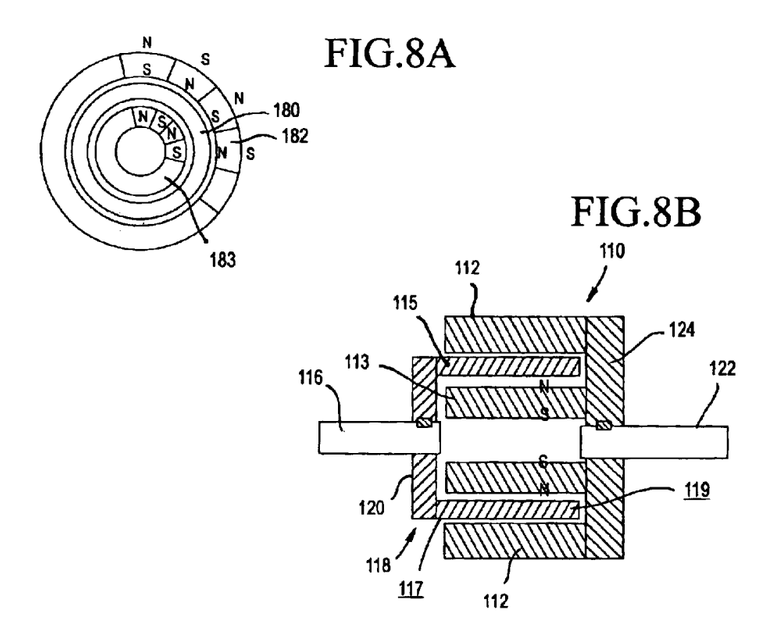
FIGS. 8A and 8B are lateral and longitudinal cross-sectional views, respectively, of another embodiment of the present invention.

Further, the magnets 32b could be positioned on supporting elements both inside and outside of the conductive cylinder 24b, as illustrated simply in FIG. 3C. A specific structure for this arrangement is shown in FIGS. 8A and 8B and is discussed in detail below. Still further, FIG. 3D shows two conductive cylinders 24c and one permanent magnet arrangement 32c.

Figure 4:
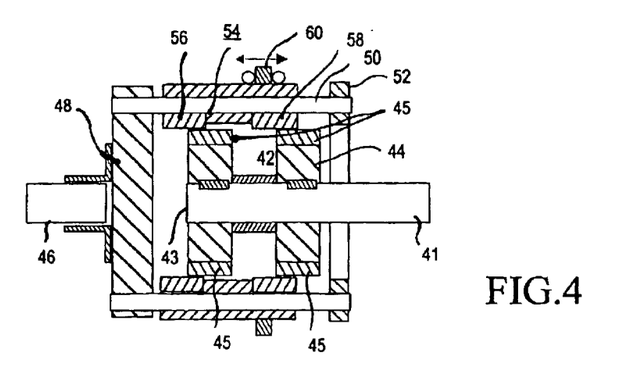
FIG. 4 is a cross-sectional view of another embodiment of the torque conversion system of the present invention.

FIG. 4 is a variation of the embodiment of FIG. 1. The machine shaft 41 has two mounting discs 42 and 44 mounted thereon, with disc 42 being positioned at the free end 43 of the machine shaft 41. Disc 44 is spaced a short distance inboard toward the machine from disc 42. In the embodiment shown, the discs have a diameter of approximately 12 inches and a thickness of approximately two inches, with the two discs being separated by a distance of two inches. On the outer peripheral edge surface of each disc 42 and 44 are a plurality of closely spaced/abutting permanent magnets 45—45 arranged in an alternating magnetic pole arrangement, similar to that of FIG. 2B, forming permanent magnet assemblies.

A motor shaft 46 has mounted thereto an inboard motor mounting disc 48. Extending forwardly from disc 48 near the periphery thereof are 6–8 elongated mounting rods 50—50, which in the embodiment shown are approximately 10 inches long and made of steel. The rods in the embodiment shown are separated by a space (distance), which can be varied. Secured to the free ends of mounting rods 50 is an outer mounting disc 52. In the embodiment shown, outer mounting disc 52 has a diameter of approximately 10 inches and a thickness of approximately ½ inch. Machine shaft 41 extends through a central opening in outer motor mounting disc 52, with the machine discs 42, 44 and the rings of permanent magnets being thus interior of the motor assembly. The inboard motor mounting disc 48, mounting rods 50—50 and an outer mounting disc 52 form the motor assembly and rotate together with the motor shaft.

Positioned on one or more adjacent mounting rods 50 is a sliding ring assembly 59 which includes two copper conductive cylinders 56 and 58 located adjacent interior surfaces 54 of rods 50. Each conductive cylinder 56, 58 is approximately ⅟₁₀-inch thick and approximately two inches long, i.e. approximately the same length as the machine discs 42 and 44. The copper conductive cylinders 56, 58 are also spaced and positioned so that machine discs 42 and 44 on machine shaft 41 can come into registry with conductive cylinders 56 and 58. The dimensions are such that when the discs 42, 44 are brought into registry with the conductive cylinders, the air gap results in good magnetic interaction between the conductive cylinders and the ends of permanent magnets 45—45 on the edge surface of the discs 42 and 44.

The sliding ring assembly 59 also has a portion which is positioned adjacent the outer surfaces of two or more mounting rods 50 and extends between those rods. The sliding ring assembly 59 has a length such that it can be moved longitudinally along rods 50—50, with the conductive cylinders 56, 58 mounted thereon moving therewith. The member for moving the sliding ring assembly 59 is shown in FIG. 4 as a hand-manipulated element 60, but the sliding ring assembly could be moved by a power system in response to a remote command by an operator, or an automatic control as well. Movement of the sliding ring assembly by the control member will bring the conductive cylinders 56, 58 gradually into registration with the rings of permanent magnets 45—45. The amount of power (torque) transferred between the motor shaft and the machine shaft can be varied, depending upon the position of the sliding control ring assembly 59, while the motor runs at a constant, efficient speed.

Figure 5:
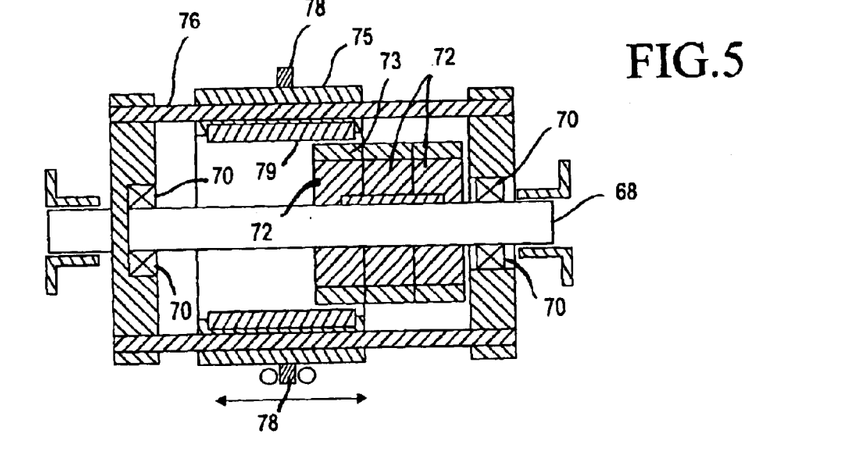
FIGS. 5, 6 and 7 are cross-sectional views of several additional embodiments of the present invention.
Figure 6:
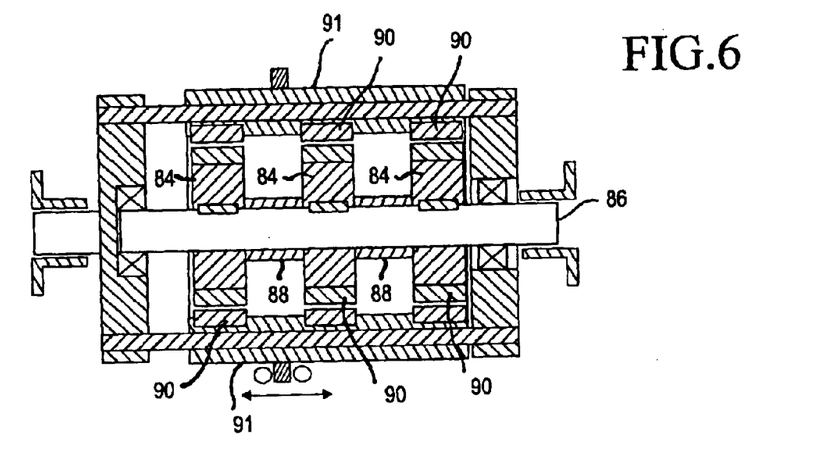
Figure 7:
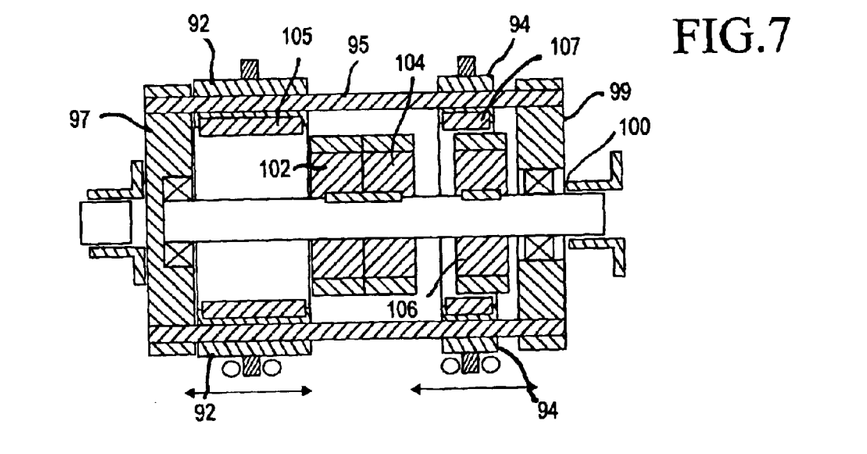

FIGS. 5, 6 and 7 show further variations of the adjustable power transfer system of the present invention. In FIG. 5, machine shaft 68 is supported at both ends of the motor assembly by bearings 70—70. Machine shaft 68 has three mounting discs 72—72 mounted thereon, with the discs abutting one another. Each of the discs has a ring of permanent magnets 73—73 with alternating polarities, spaced closely to or abutting their peripheral edge surfaces.

FIG. 5 includes a motor assembly similar to that of FIG. 4, except that the plurality of mounting rods 76—76 are longer to accommodate in the interior space the three machine mounting discs (or more, if desired).

A single ring control assembly 75 slides along rods 76 by virtue of a control member 78 (or alternate power/automatic control system). A conductive cylinder of copper 79 is secured to the internal surface of the interior control portion of the ring control assembly, the conductive cylinder 79 having a length approximately equal to the three abutting magnetic discs 72, with the permanent magnets thereon. Again, by moving the control ring assembly, the physical relationship between the conductive cylinder and the rings of permanent magnets can be changed to provide an adjustable power transfer between the motor and the machine.

FIG. 6 shows an embodiment, which is similar to FIG. 5, except that the individual machine mounting discs 84 on the machine shaft 86 are separated by a selected distance set by spacer elements 88—88. There are also three separate magnetically conductive cylinders 90—90, as opposed to the single cylinder of FIG. 5. The width and spacing of the individual mounting discs 84 match the widths and spacing of the conductive cylinders. Control over power transfer is provided by a sliding control ring assembly 91 on which is mounted the conductive cylinders. In the embodiment of FIG. 6, only a relatively short stroke is needed to provide a full range of power transfer, while the embodiment of FIG. 5 requires a longer stroke.

FIG. 7 shows another variation of the adjustable power transfer system, with a double control assembly. The double control assembly includes a first sliding ring control assembly 92 and a second sliding ring control assembly 94 which is spaced apart from the first sliding ring control assembly. Both the first and second sliding ring assemblies 92 and 94 are slidably mounted on the mounting rods 95—95 of the motor assembly, which extend between motor discs 97 and 99. In the embodiment shown, mounted on machine shaft 100 are two mounting discs. Mounting disc 102 is arranged to come into registry and hence good magnetic interaction with the conductive cylinder 105 on sliding ring control assembly 92, while spaced mounting disc 106 is positioned to operate in juxtaposition with conductive cylinder 107 on sliding ring control assembly 94. In the embodiment shown, disc 102 is double the width of disc 104.

Sliding ring control assembly 92 is movable independently of sliding ring control assembly 94 and vice versa. In the embodiment shown, sliding control assembly 92 provides the main control over the power transmitted because of its size, with the corresponding size of mounting disc 102, while assembly 94 provides for secondary, more precise control over the transmitted power. Some of the magnets mounted on disc 106 may differ in length or, in some cases, selected magnets may be omitted. This gives the assembly 94 a more accurate, precise control over the power transmitted to the machine.

FIGS. 8a and 8b show another embodiment of the present invention, in which the machine assembly 110 includes two cylindrically arranged rings of permanent magnets 112, 113, the two rings being positioned on both sides (externally and internally) of an extending copper conducting cylinder 115. In more detail, motor shaft 116 has mounted thereon a motor assembly 118, which includes a mounting disc 120 and electrically conducting cylinder 115, which extends rearwardly from and is secured to the disc 120 at its periphery. The outer surface 117 of cylinder 115 is coincident with the outer peripheral edge surface of disc 120, although this is not necessary. Machine shaft 122 has connected thereto a machine assembly, which includes a mounting disc 124. Extending away from disc 124 and perpendicular thereto in the direction of the motor is a first ring assembly of permanent magnets 112 in a cylindrical arrangement. The magnets have alternating polarities as shown, with one pole being the upper longitudinal surface of the magnet and the other pole the lower longitudinal surface. Each permanent magnet is approximately two inches long by one inch wide and one inch thick.

The first ring assembly of permanent magnets 112 is approximately the same length as the copper-conducting cylinder 115 and is adjacent the exterior surface 117 thereof. The air gap between the first ring of permanent magnets 112 and the copper-conducting cylinder 115 is such as to provide good magnetic interaction between the elements.

The second ring assembly of permanent magnets 113 is substantially identical to the first ring of permanent magnets except for the diameter of the ring arrangement. The second ring of permanent magnets 113 is positioned adjacent the interior side of the copper conducting cylinder 115, again with an air gap which provides good magnetic interaction between the copper conducting cylinder 115 and the second ring of permanent magnets 113.

The magnetic field in this embodiment basically is configured in three different ways: first, between the north and south poles of the permanent magnets in the first ring of permanent magnets, along the outside surface (exterior) 117 of the conducting cylinder 115; second, between the first and second rings 112, 113 of permanent magnets through the thickness dimension (the wall) of the conducting cylinder 115; and third, between the north and south poles of the second (interior) ring of permanent magnets 113 along the interior surface 119 of the conducting cylinder. The advantage to this embodiment, involving a copper-conducting cylinder 115 between two spaced concentric rings of permanent magnets, is to provide a stronger magnetic field and better power transfer between the motor and the machine.

Figure 9:
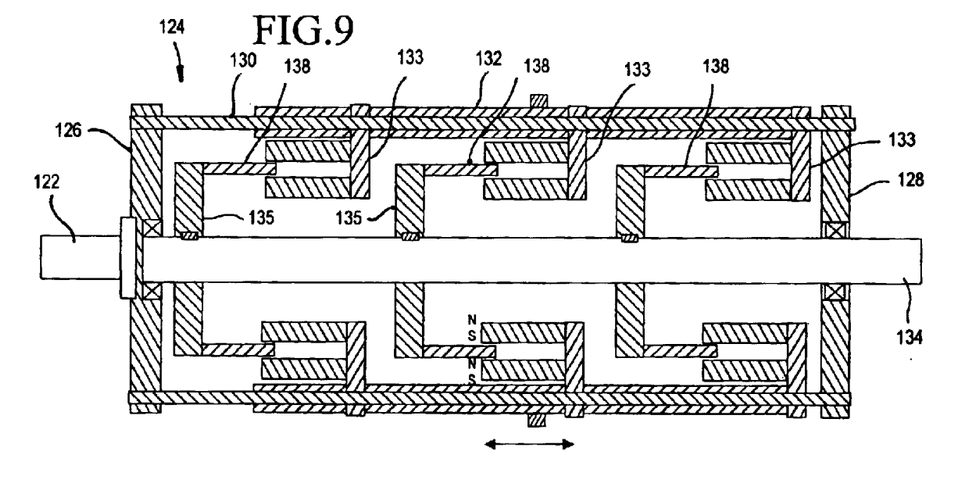
FIG. 9 is a cross-sectional view of a more complex variation of the system of FIGS. 8A/8B.

FIG. 9 shows a variation of the embodiment of FIGS. 8A and 8B. It includes a motor shaft 122 and a motor assembly 124. The motor assembly includes first and second spaced mounting discs 126 and 128 joined by an extended plurality of mounting rods 130—130 arranged in a cylindrical configuration. A permanent magnet assembly 132 is mounted on rods 130 for sliding action therealong. Assembly 132 includes three spaced dual rings of permanent magnets 133—133 which are positioned in the internal space defined by rods 130 and are similar in configuration, respectively, to that shown in FIGS. 8A and 8B.

A machine shaft 134 extends through an opening in disc 128 to disc 126. Shaft 134 is mounted for rotation by bearings in both discs 126 and 128. Mounted on and extending radially away from machine shaft 134 is three-spaced assembly mounting discs 135—135. Mounted to and extending longitudinally away from the discs 135, in the direction of the machine, are copper electrically conducting cylinders 138—138.

The copper cylinders 138 are positioned and sized so as to fit between the spaced first and second rings of permanent magnets. While the embodiment of FIG. 9 shows three copper cylinder/permanent magnet ring arrangements, a different number of such combinations can be used. The advantage of the double rings of magnets with the intermediate copper cylinder is to increase the power transmitted.

Figure 10:
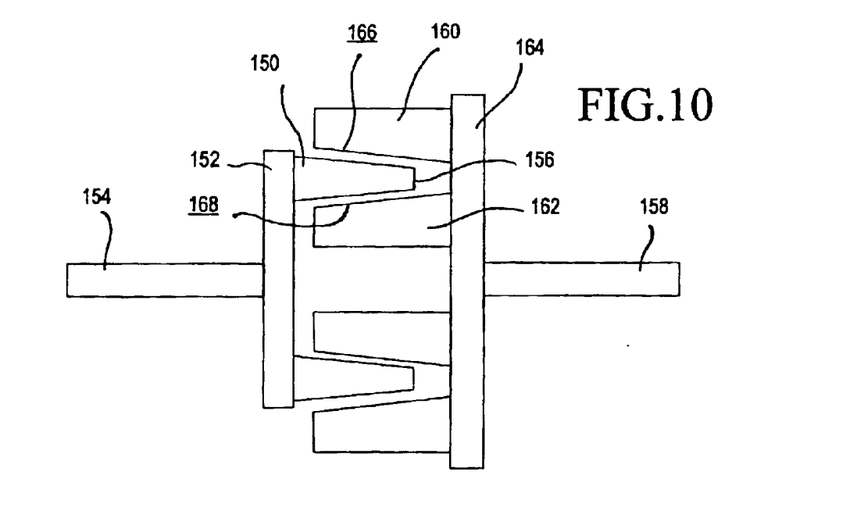
FIG. 10 is a cross-sectional view of another embodiment of the present invention.

An additional embodiment for modulating the power transmitted is shown in simplified form in FIG. 10. In this embodiment, the conducting cylinder portion 150 of the system extends away from mounting plate 152 on motor shaft 154, is conical in cross-section, i.e. the width of its cylindrical wall increases from its base at plate 152 to its free end 156. In the embodiment shown, the wall surfaces angle toward each other at approximately 10–20°; however, this could be varied.

Mounted on machine shaft 158 are two concentric rings of permanent magnets 160 and 162, which extend outwardly from mounting plate 164. The facing surfaces 166, 168, respectively, of the two rings of magnets angle outwardly away from each other from mounting plate 164. The angle is the same as the angle of the surfaces of the conducting cylinder 150. Hence, the conical (cross-section) conducting cylinder 150 nests within the mating conical opening between the two rings of permanent magnets 160 and 162. Some of the magnets on the two rings of magnets are longer than others; the longer ones begin transmitting power before the other magnets. Movement of the conducting cylinder and the permanent magnet assemblies toward and away from each other, with the arrangement shown, is a convenient means of modulating the power transmitted.

FIGS. 11–16 show embodiments using variable magnetic torque transfer for a vehicle differential. FIG. 10 is a simple illustration of the basic concept. A motor, such as a car motor, represented at 160, supplies power to a drive assembly 162, which includes two circular electronically conductive discs 164 and 166 joined by a bar 168. Rotatable permanent magnet assemblies 170 and 172 are arranged relative to the discs, the permanent magnet assemblies being mounted on axle shafts, which extend to the left and right wheels, respectively. The motor will drive one wheel (the left wheel in FIG. 11) through disc 164 and associated magnet assembly 170, and will drive the other wheel (the right wheel) independently through disc 166 and associated magnet assembly 172.

Figure 11:
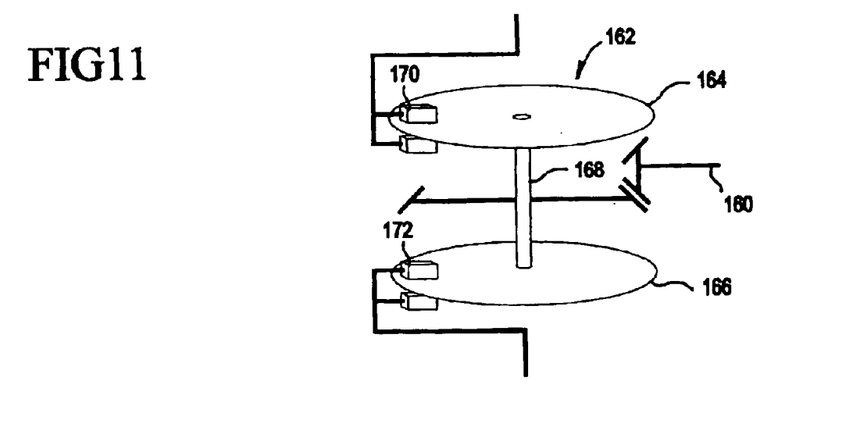
FIG. 11 is a simplified representation of a vehicle differential system of the present invention.

In operation, when one wheel does not obtain any traction (i.e. when it is in mud or on ice), its speed will increase, with a corresponding increase in the speed of rotation of its associated magnet assembly. The difference between the rotating speed of the magnet assembly and the speed of the conductive disc driven by the motor will thus decrease, reducing the power (torque) provided to that wheel, until it is at a minimum or zero. If the other wheel has traction, it will continue to rotate at regular speed, such that there continues to be a significant speed of rotation of that permanent magnet assembly relative to its associated conductive disc. The power (torque) to that wheel thus remains high. The vehicle will move because of the traction of the one wheel, until both wheels again have traction and the speed of the first wheel again slows down, with an increase in the difference between the rotating speed of the magnet assembly and the conductive disc, resulting in torque to the wheel.

This arrangement is useful over a wide power range, at least from 10 HP to 1000 HP at consistent speeds of 3600 RPM and greater. The magnetic differential channels the full power of the motor to the particular wheel with traction. With the magnetic differential, there is no need for any gears, clutch or electronic control.

Figure 12:
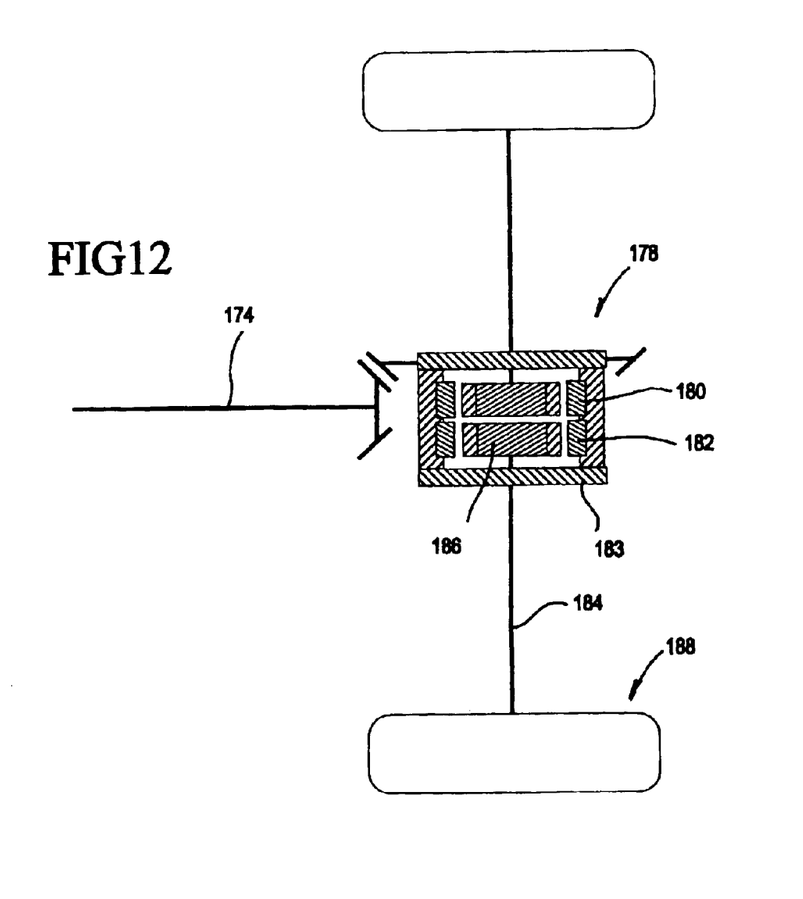
FIGS. 12 and 13 are cross-sectional views of two variations of a vehicle differential system, without torque control.

FIG. 12 is a more detailed diagram of one embodiment of the magnetic differential, which does not have adjustable power control. Motor shaft 174 turns at a specific defined speed produced by a vehicle motor (not shown). Motor shaft 174 will turn the motor shaft assembly 178 about an axis, which is perpendicular to the motor shaft 174. Mounted on an internal surface of the motor assembly 178 perpendicular to the motor shaft 174 are two spaced copper electronically conductive cylinders 180 and 182. Extending through one end member 183 of motor shaft assembly 178 is an axle shaft 184. On the inboard end of axle shaft 184 is a mounting disc 186 having a ring of permanent magnets positioned on the peripheral edge thereof, similar to the embodiments discussed above FIGS. 1–10). Axle shaft 184 extends outboard from the motor assembly 178 to a first wheel 188. A similar structural arrangement is provided at the other side of motor assembly 178 for the other wheel.

In the embodiment shown, disc 186 on the end of axle shaft 184 is in registry with conductive ring 182. The disc 186, axle shaft 184 and wheel 188 turn completely independently of the other axle shaft arrangement. As discussed above, when one wheel loses traction, the torque provided by the motor is in effect shifted to the other wheel. Also, again as discussed above, the independent actuation of the two wheels is accomplished without gear arrangements or other control mechanisms. There is no mechanical coupling between the two axles or between either axle and the motor.

Figure 13:
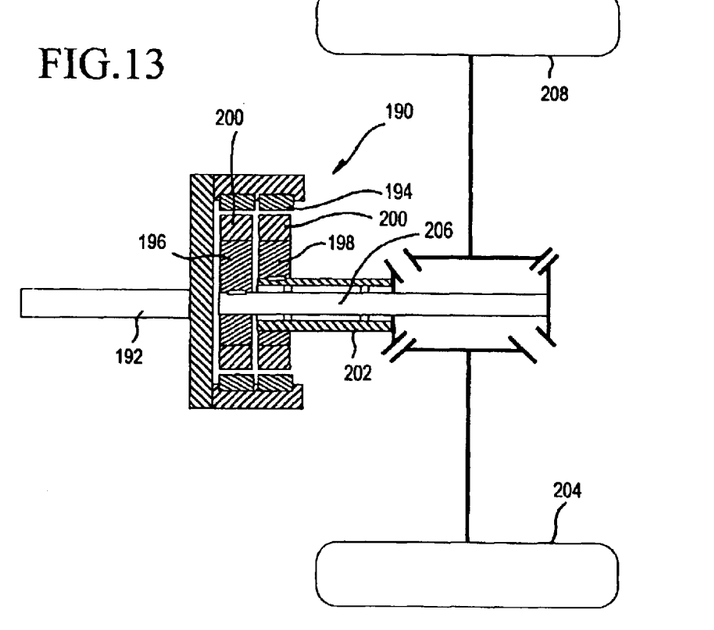

FIG. 13 shows a variation of the differential arrangement of FIG. 12. A motor shaft 192 drives a motor assembly 190. Motor assembly 190 is connected to the motor shaft such that the motor assembly 190 turns about the same axis as motor shaft 192 when the motor shaft turns. Mounted on the interior surface of motor shaft 190 is a copper electronically conductive cylinder 194. Juxtaposed with cylinder 194 are two substantially abutting mounting discs 196 and 198, each of which has a plurality of permanent magnets 200 positioned on the peripheral edge surfaces thereof, respectively, in the manner described above.

Disc 198 is mounted on a hollow shaft 202, that extends rearwardly of the vehicle from the motor assembly and to which is connected one wheel, i.e. right wheel 204. The other disc 196 is mounted on shaft 206. Shaft 206 is connected to the other wheel on the vehicle, i.e. left wheel 208. In the embodiment shown, shaft 206 extends down the center of hollow shaft 202. The action of the embodiment of FIG. 13 is similar to that of FIG. 12.

Figure 14:
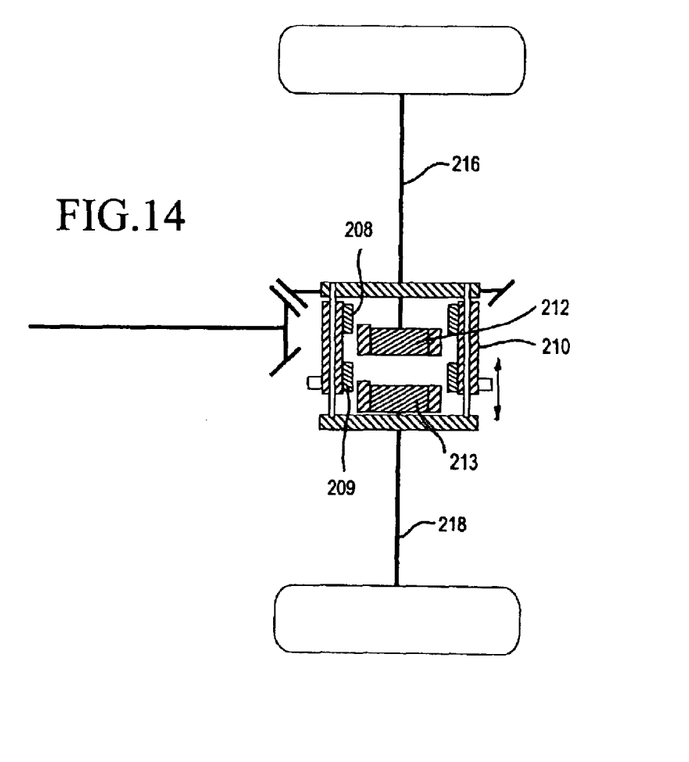
FIGS. 14 and 15 are cross-sectional views of a vehicle differential system, with torque control.
Figure 15:
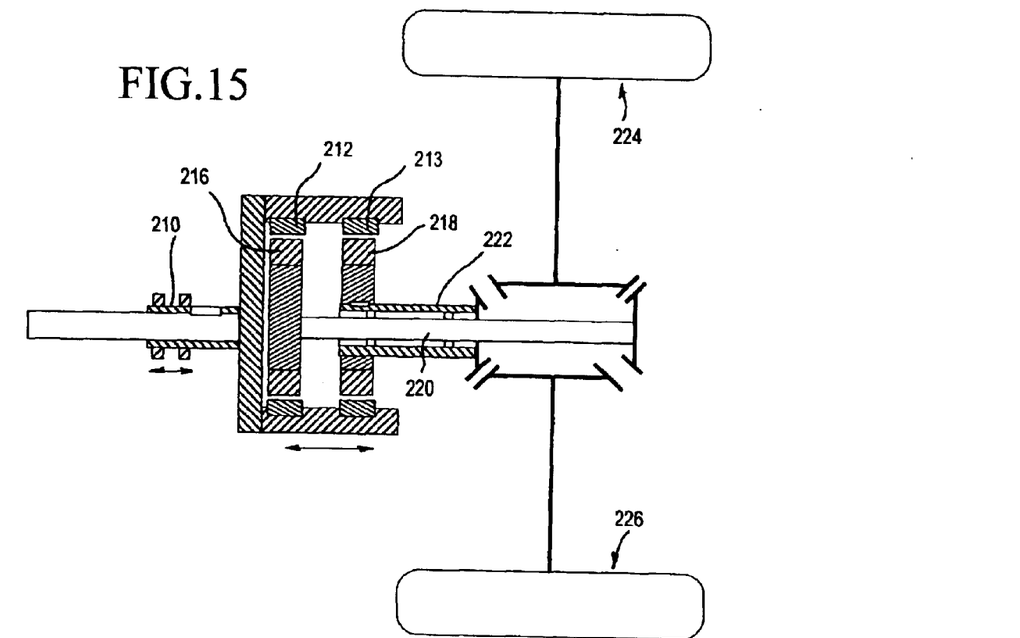

The embodiments of FIGS. 12 and 13 show a differential where the torque is not adjustable, since the permanent magnets 200—200 are positioned in fixed registration with the copper conductive cylinder 194. FIGS. 14 and 15 show embodiments, which are similar to FIGS. 12 and 13, except that they do have power (torque) control. In FIG. 14, for instance, which is generally structurally similar to FIG. 13, the two copper electronically conductive cylinders 208, 209 are separate and mounted on a sliding control ring assembly 210. The permanent magnet mounting discs 212, 213, mounted on their associated axle shafts 216, 218, are also physically separated the same distance as the conductive cylinders. Movement of the control ring assembly 210 will change the magnetic coupling relationship between the conductive cylinders 208, 209 and the ring of permanent magnets, providing a capability for change of the torque transfer as the sliding control ring assembly 210 is moved, as shown by the arrows.

FIG. 15 is similar to FIG. 12 in physical arrangement, again with the copper electronically conductive cylinders 212, 213 being separated and spaced apart, as are the respective pluralities of permanent magnets 216 and 218, mounted on their respective shafts 220 and 222, which in turn drive their associated wheels 224 and 226 independently.

With the embodiments of FIGS. 14 and 15, the two wheels are not only independently driven, but the torque transfer between the motor and the axle assemblies can be controlled by sliding the control ring assembly, which changes the magnetic relationship between the individual conductive cylinders and the permanent magnets.

Figure 16:
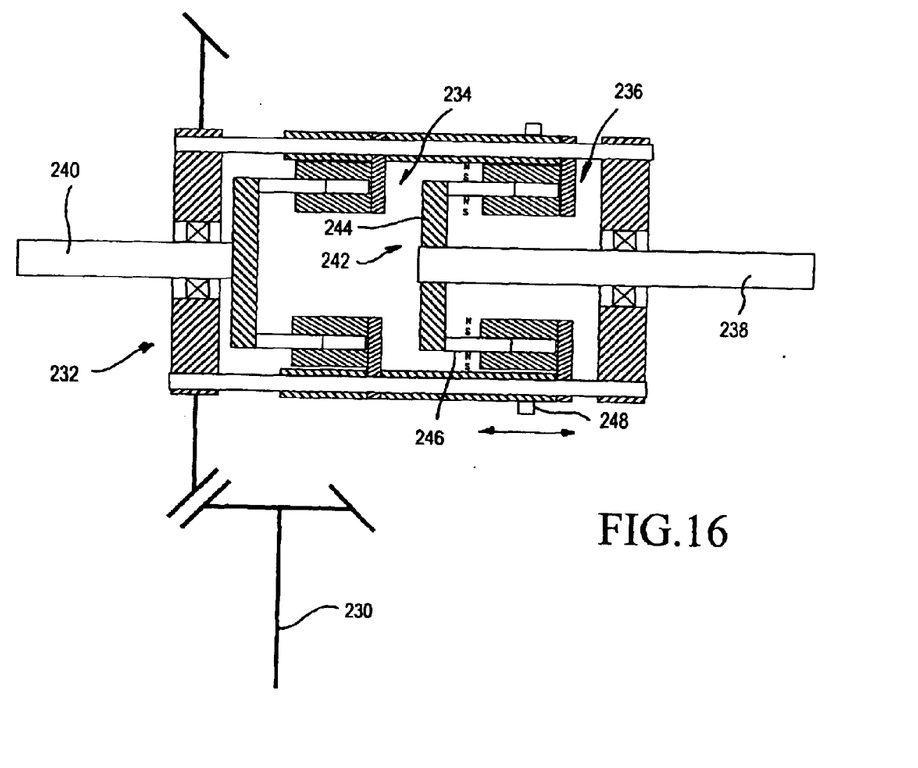
FIG. 16 is a cross-sectional view of a vehicle differential using the structural concept of the arrangement of FIG. 13.

FIG. 16 shows the double set of rings of magnets/conducting cylinders of FIGS. 8 and 9 in the form of an automobile differential. The automobile engine (not shown) acts with the motor shaft assembly 230 to rotate a motor assembly, shown generally at 232. The motor shaft assembly includes two spaced apart, dual permanent magnet ring assemblies 234 and 236, configured similarly to that shown in FIG. 9. Extending into the interior of the motor shaft assembly 224 are axle shaft 238, to which is secured the right wheel (not shown) and axle shaft 240, to which is secured the left wheel (not shown).

Mounted to the interior end of each axle shaft is an axle shaft assembly (shaft assembly 242 is exemplary), which includes a mounting disc 244 and an extending electrically conductive cylinder 246. The permanent magnet assemblies can be moved longitudinally by a control element 248 to provide variable power transfer. The differential of FIG. 15 operates in similar fashion to the variable torque differential of FIG. 14, with the multiple cylinder/permanent magnet arrangement of FIG. 9.

Figure 17:
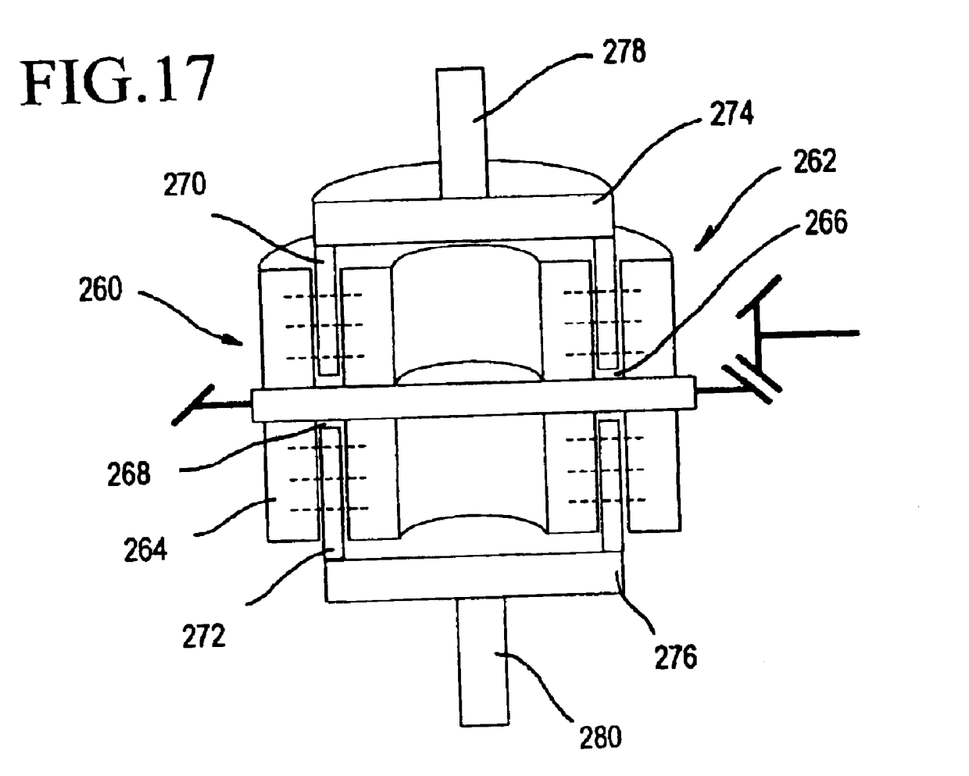
FIG. 17 is a cross-sectional view of another embodiment of a vehicle differential system.

FIG. 17 shows another embodiment of a vehicle differential, which features a compact design that is capable of transmitting a high torque with a relatively small volume. A motor drives a motor assembly shown generally at 260. The motor assembly includes two permanent magnet ring assemblies 262 and 264, each assembly in the form of a doughnut. Each doughnut in the embodiment shown includes 3 rings of permanent magnets. This number could be varied. Extending into circular slots 266 and 268 in each ring assembly are conducting cylinders 270 and 272. Mounted to the outboard edge of the conducting cylinders, respectively, are plates 274 and 276. Connected to one plate 274 is an axle shaft 278 for one wheel; connected to the other plate 276 is axle shaft 280 for connection to the other wheel. Again, turning the motor shaft results in independent coupling of the motor power to the respective wheel axles.

Although the magnet assemblies 262, 264 are shown connected to the motor and the conducting cylinders 270, 272 are shown connected to the wheel axles, it should be understood that it could be the reverse, with the conducting cylinders connected to the motor and the magnet assemblies connected to the wheels.

Accordingly, several embodiments of the present invention have been disclosed, all of which include a motor assembly and a machine assembly, wherein one of the assemblies, typically the motor assembly, includes a copper electronically conductive ring or cylinder, and wherein the other assembly includes at least one ring of permanent magnets arranged to come into a position adjacent the conductive element where there is substantial magnetic interaction therebetween, such that the turning of the motor shaft results in the turning of the machine shaft, coupling the motor power to the machine. Equally possible and covered by the present invention is a reverse arrangement, where the copper electrically conductive cylinder is mounted on the machine assembly and the ring of permanent magnets is mounted on the motor assembly.

Typically, the motor assembly and the machine assembly are movable relative to each other longitudinally so as to provide control over the magnetic interaction, and hence control over the amount of torque, which is delivered to the machine, i.e. a variable torque transfer arrangement.

Since the system is magnetic, there is no mechanical interaction and hence virtually no wear, which occurs between the magnetically interacting, portions. The system can be used to drive a wide variety of machine devices, including a motor/wheel drive arrangement (differential) for a motor vehicle. In general, the term "vehicle" is intended to be broad, including bicycles and diesel-electric locomotives, as a few examples.

Although several embodiments of the invention have been disclosed for purposes of illustration, it should be understood that various changes, modifications and substitutions might be made in such embodiments without departing from the spirit of the invention, which is defined by the claims, which follow.

What is claimed is:

1. A magnetic drive differential system for a vehicle, comprising:
   a driving assembly, driven by a vehicle motor which is connected to a motor shaft, which includes two electrically conductive cylinders, each having a selected length; and
   a coupling structure which includes first and second ring-shaped assemblies of permanent magnets operating independently of each other, in association, respectively, with the two electrically conductive cylinders, the coupling structure further including first and second axle shafts to which the permanent magnet assemblies, respectively, are mounted, such that rotation of the motor shaft results in independent rotation of the axle shafts, wherein vehicle wheels are mounted at the free ends of each axle shaft, the vehicle wheels thus operating independently of each other in response to motor action.

2. A system of claim 1, wherein the coupling structure includes first and second mounting elements upon which the first and second assemblies of permanent magnets, respectively, are mounted, and wherein the two axle shafts are mounted on and extend from the mounting elements and extend in opposing directions.

3. A system of claim 1, wherein the coupling structure includes first and second mounting elements upon which the first and second assemblies of permanent magnets, respectively, are mounted, and wherein the mounting elements are in turn mounted on first and second mounting shafts, which are further in turn coupled to the first and second axle shafts, respectively, wherein the first mounting shaft is positioned at least partially within the second mounting shaft.

4. A system of claim 1, wherein the electrically conducting cylinders are arranged to be movable by a control member so that a variable torque transfer is available between the motor and the coupling structure, and hence to the first and second axle shafts.

5. A magnetic drive differential system for a vehicle, comprising:
   a driving assembly, driven by a vehicle motor, wherein the driving assembly includes first and second pairs of concentric permanent magnet ring-shaped assemblies with a defined space between them; and
   a machine assembly, including first and second axle members having vehicle wheels mounted thereon, each axle member including a mounting element having an electrically conductive cylinder extending therefrom, each electrically conductive cylinder configured, respectively, to fit between and come into a magnetic relationship with one pair of permanent magnetic assemblies, wherein actuation of the driving assembly by the vehicle motor results in driving of the vehicle wheels.

6. A system of claim 5, including means for moving the driving assembly and the machine assembly relative to each other so as to provide a variable power transfer between the motor and the vehicle wheels.

* * * * *